Aug. 10, 1954  E. R. VOTRIAN  2,685,947
CLUTCH OR BRAKE EMPLOYING MAGNETIC PARTICLES
Filed June 17, 1950  2 Sheets-Sheet 1

INVENTOR.
ELMER R. VOTRIAN
BY
ATTORNEY

*INVENTOR.*
ELMER R. VOTRIAN
BY
ATTORNEY

Patented Aug. 10, 1954

2,685,947

UNITED STATES PATENT OFFICE 2,685,947

CLUTCH OR BRAKE EMPLOYING MAGNETIC PARTICLES

Elmer R. Votrian, O'Fallon, Ill., assignor to Vickers Incorporated, Detroit, Mich., a corporation of Michigan Application June 17, 1950, Serial No. 168,787

2 Claims. (Cl. 192—21.5)

This invention relates to magnetic coupling devices.

Magnetic coupling devices, such as clutches, brakes, etc. employing magnetic particles to transmit torque between spaced coupling members may, with respect to the magnetic working gap configuration, be divided into two general categories. In one type, the magnetic working gaps are cylindrical or radial and are formed by concentric magnetic cylinders, whereas in the second type the gaps are axial and are formed by sandwiched multiple discs, the spaces therebetween being the gaps.

As in other rotating machinery, the rotating parts of magnetic coupling devices should be dynamically balanced in order to reduce vibration during operation. To achieve reasonable balance, any integral rotating part formed from a plurality of components secured together should be balanced as an integral unit, and not in any divided form. Heretofore, this has not been generally possible in the case of multiple disc magnetic coupling devices. This is due to the fact that the alternate discs must be assembled piece by piece before each of the integral relatively rotatable members can be clamped together as a rotatable unit.

The invention herein contemplates a magnetic coupling device having a plurality of coupling discs wherein alternating discs have complementary teeth and slots therebetween which permit axial assembly of integral units instead of the heretofore referred to piece by piece assembly.

It is therefore an object to provide a new and useful magnetic coupling device.

Further objects and advantages of the present invention will be apparent from the following description, reference being had to the accompanying drawings wherein a preferred form of the present invention is clearly shown.

Figure 1:
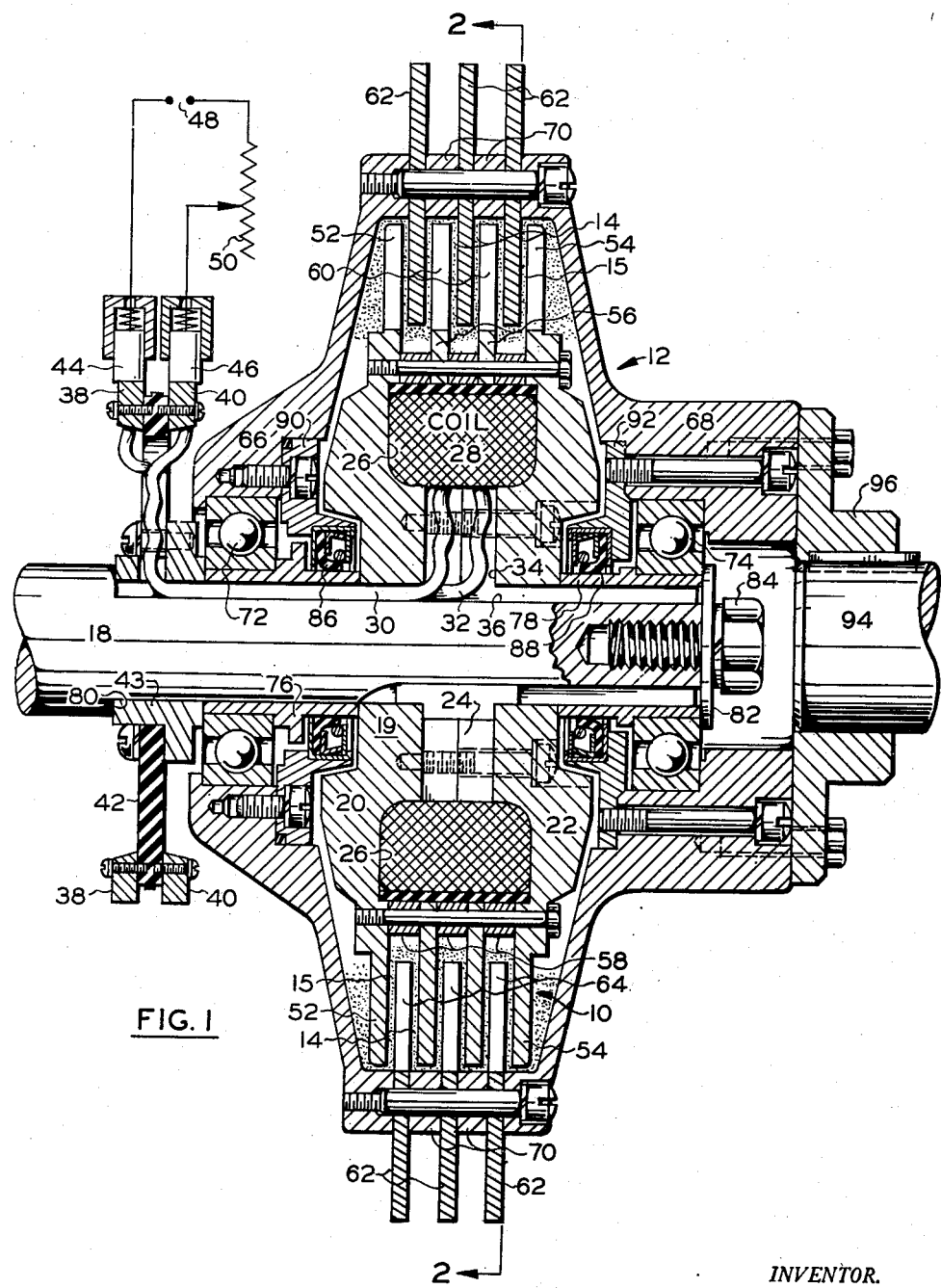
Figure 1 is a sectional view illustrating a magnetic clutch embodying features of the invention, the section being taken along the rotative axis of the clutch.
Figure 2:
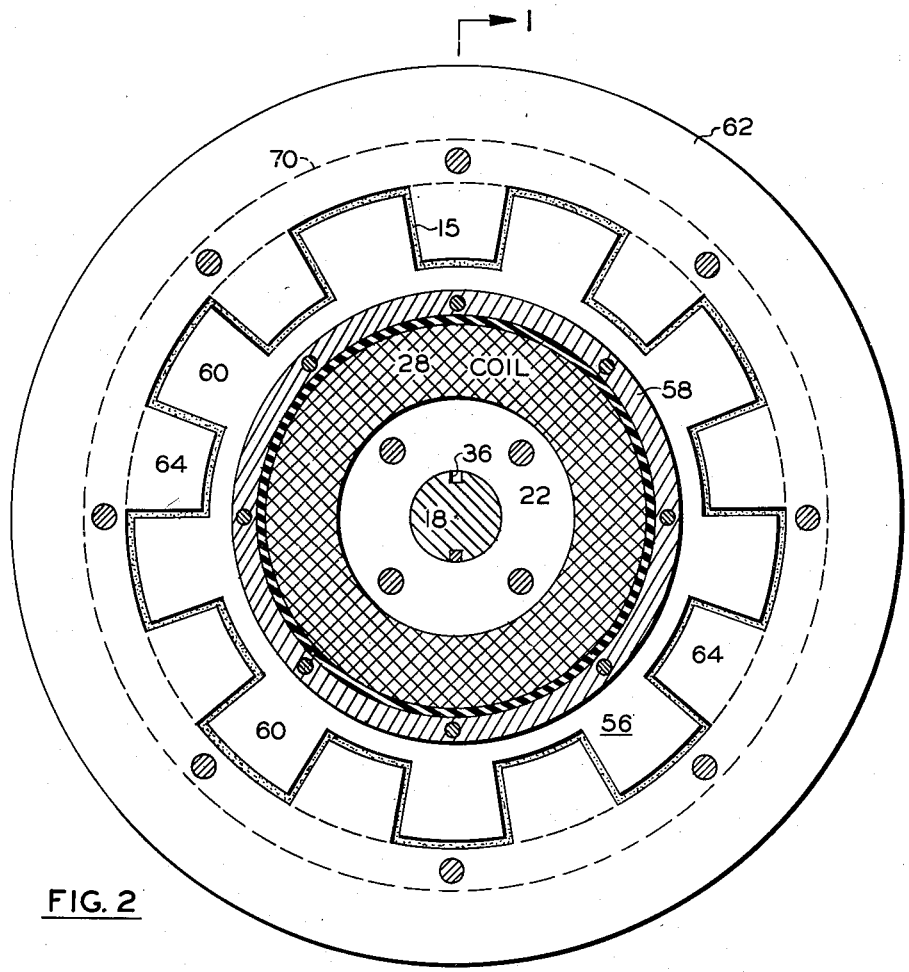
Figure 2 is another sectional view of the clutch illustrated in Figure 1, the section being taken on the line 2—2 of that figure.

As seen in Figure 1 the clutch includes a pair of relatively rotatable coupling members, a driving member 10 and a driven member 12 both having a plurality of magnetic surfaces defining a plurality of magnetic working gaps 14 partially filled with particles of magnetic materials 15, such as iron, which may be mixed with either a wet or dry lubricant.

The driving member 10 is keyed to a shaft 18 and includes a magnetic yoke 19 made from a pair of toothed circular pole sides 20 and 22 surrounding the shaft 18, and abutting each other as indicated at 24 to form a low reluctance joint and an annular channel 26 with a U-shaped cross-section for receiving a magnetizing coil 28. Leads 30 and 32 from the coil 28 are brought out through a small opening 34 at the joint 24 and an axial slot 36 in the shaft 18, and are connected to a pair of slip rings 38 and 40 carried by an insulating disc 42 fixed on a collar 43 to rotate with the shaft 18. A pair of brushes 44 and 46, contacting the rings 38 and 40, respectively, may be connected to a suitable source 48 of control current through a variable control 50. The path of control current to the exciting coil 28 is obvious from the figure.

The pole sides 20 and 22 are circumferentially slotted to provide teeth 52 and 54, respectively, which extend radially outward from intermediate portions of the respective pole sides. Clamped between the pole sides 20 and 22 are a plurality of toothed magnetic plates or discs 56 separated by non-magnetic spacer rings 58. The teeth 60 on these circular plates or discs also extend radially outward.

The discs 56 are spacially interleaved between magnetic ring-like discs 62 of the driven member 12 which have radial inwardly extending teeth 64 and are carried by two non-magnetic end bells 66 and 68 between which the discs 62, spaced by non-magnetic rings 70, are clamped. The spaces between the magnetic discs 62 and the magnetic discs 56 and the pole sides 20 and 22, defined by adjacent surfaces of discs 62 and 56 and adjacent surfaces of discs 62 and pole sides 20 and 22, are the magnetic working gaps 14 of the clutch and are filled to a suitable extent, with magnetic particles 15, either alone or mixed with a lubricant or any other desired material. Heat dissipation is materially aided by the large area of the discs 62 whose outer portions act as cooling fins.

The driven member 12, which includes the end bells 66 and 68 and the magnetic discs 62 carried thereby, completely encloses the driving member 10, and is journalled for rotation about shaft 18 on bearings 72 and 74 which are mounted on sleeves 76 and 78 disposed on opposite sides of the driving member and fitted on the shaft 18. As seen in Figure 1, axial rigidity and desired spacing is maintained by clamping in series and in the following order the collar 43, sleeve 76, the magnetic yoke 19, and sleeve 78, between an annular shoulder 80 formed on the shaft 18, and a washer 82 drawn up to the shaft by a machine screw 84.

Leakage of magnetic particles into and through the bearings 72 and 74 is prevented by seals 86 and 88 carried by bearing retaining rings 90 and 92, respectively, which are secured to the inner sides of the end bells 66 and 68. The output of the clutch is taken through a shaft 94 connected to a flanged coupling 96 secured to the end bell 68.

The teeth on the discs 56, the discs 62, and the pole sides 20 are so proportioned and spaced that the teeth on the discs of the driving member 10 will axially pass through the interdental spaces (slots) of the discs of the driven member and vice versa; that is, the teeth on the discs of either member will pass through the interdental spaces on the discs of the other member upon relative axial movement between the members such as would occur if it were desired to disassemble the clutch by first removing the end bell 68 of the driven member 12 and then pulling out the driving member 10 intact.

Figure 3:
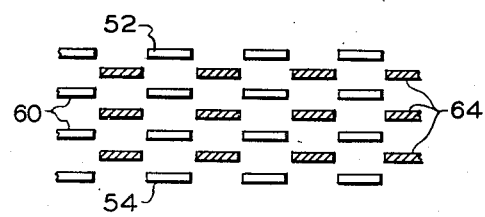
Figures 3 and 4 are developed peripheral partial views taken on a cylindrical section passing through the circumference of the inner rotating member and showing two ways of aligning the teeth of alternate discs.
Figure 4:
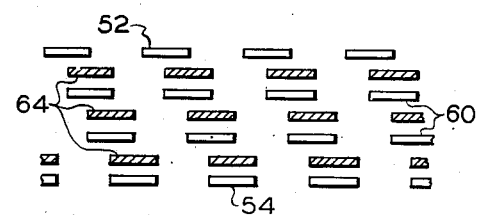

The teeth of the discs on both members may be aligned in any suitable manner which will permit axial passage of one member through the other so that the inner member may be dynamically tested as a unit, and the clutch assembled without the necessity of removing the separate discs of the inner member. Two variants of tooth alignment are shown in Figures 3 and 4. In Figure 3, the discs in each member are aligned so that their teeth are in straight rows across the discs, whereas in Figure 4 the discs in each member are aligned so that a staggering effect is obtained. In assembling or disassembling the embodiment illustrated in Figure 4, the members are axially moved at a distance of about one disc at a time, then partially turned and axially moved again, etc.

Thus it will be seen that the inner member 10 can be assembled intact into the clutch, and that the inner member will be accessible as an integral unit for balancing purposes. The outer member 12 is, of course, externally accessible for balancing. It will be appreciated that although the inner member is the driving member and the outer member is the driven member in this disclosure, their relative position may be reversed; that is, the inner member may be the driven member, etc. The invention is equally applicable where the one coupling member is fixed and the other coupling member rotates as in a magnetic brake. In any case, the coupling members are referred to as relatively rotatable, whether one or both are rotatable, and whether slipping, lock-in, or other type of action is required.

While the form of embodiment of the invention as herein disclosed constitutes a preferred form, it is to be understood that other forms might be adopted, all coming within the scope of the claims which follow.

What is claimed is as follows:

1. A magnetic particle coupling device comprising relatively rotatable inner and outer coaxial magnetic coupling members, the outer member having radial teeth extending inwardly to define a circular opening, the inner member having radial teeth extending outwardly, said teeth having broad surfaces in planes perpendicular to the axis of said members, the teeth of one member being interleaved between teeth of the other member whereby broad surfaces of the teeth of the respective members face each other in axially spaced apart relation to define a plurality of axially spaced working gaps in substantially parallel planes, magnetic particles in said gaps, and magnetizing means for exciting said particles thereby to form a force transmitting bond between the teeth of the respective members, said teeth being so proportioned and spaced that the teeth of one member can pass through interdental spaces of the other member upon relative axial movement between said members.

2. A magnetic particle coupling device comprising relatively rotatable inner and outer magnetic coupling members the inner member having a plurality of discs each having outwardly extending teeth around its periphery, the outer coupling member having a plurality of ring-shaped discs each having inwardly extending teeth around its inner circumference, all of said teeth having broad surfaces in the planes of their respective discs, the discs of both members being interleaved and spaced whereby teeth of the respective members are axially spaced apart but overlap radially, magnetic particles in the spaces between the discs of the respective members, and magnetizing means for exciting said magnetic particles thereby to form a force transmitting bond between the respective coupling members, the proportions of said teeth and the interdental spaces being such that upon relative axial movement between the inner and outer members the teeth on the discs of one member can pass through the interdental spaces of the discs of the other member.

References Cited in the file of this patent

UNITED STATES PATENTS

| Number | Name | Date |
|---|---|---|
| 1,192,233 | Severy | July 25, 1916 |
| 1,666,445 | Last | Apr. 17, 1928 |
| 1,901,988 | Rudquist | Mar. 21, 1933 |
| 2,002,629 | Cobb et al. | May 28, 1935 |
| 2,510,675 | Baruch | June 6, 1950 |
| 2,629,472 | Sterner | Feb. 24, 1953 |

FOREIGN PATENTS

| Number | Country | Date |
|---|---|---|
| 485,591 | Belgium | Nov. 13, 1948 |
| 671,684 | France | Dec. 16, 1929 |

OTHER REFERENCES

Magnetic Fluid Clutch in Servo Applications, Nov. 19, 1949, Electronics, pages 100 to 103, inclusive.